United States Patent
Wu et al.

(10) Patent No.: US 12,072,782 B2
(45) Date of Patent: Aug. 27, 2024

(54) RESOURCE MONITORING FOR WEB APPLICATIONS WITH VIDEO AND ANIMATION CONTENT

(71) Applicant: CITRIX SYSTEMS, INC., Fort Lauderdale, FL (US)

(72) Inventors: Hao Wu, Jiangsu (CN); Maohui Wu, Jiangsu (CN); Yiming Wang, Jiangsu (CN)

(*) Notice: Subject to any disclaimer, the term of this patent is extended or adjusted under 35 U.S.C. 154(b) by 97 days.

(21) Appl. No.: 17/643,612

(22) Filed: Dec. 10, 2021

(65) Prior Publication Data
US 2023/0142390 A1    May 11, 2023

Related U.S. Application Data

(63) Continuation of application No. PCT/CN2021/129693, filed on Nov. 10, 2021.

(51) Int. Cl.
| | |
|---|---|
| *G06F 11/30* | (2006.01) |
| *G06F 16/958* | (2019.01) |
| *G06T 13/80* | (2011.01) |

(52) U.S. Cl.
CPC ........ *G06F 11/3096* (2013.01); *G06F 16/958* (2019.01); *G06T 13/80* (2013.01)

(58) Field of Classification Search
CPC ............... G06F 16/958; G06F 11/3096; G06F 16/9577; G06T 13/80
USPC ........................................................ 709/224
See application file for complete search history.

(56) References Cited

U.S. PATENT DOCUMENTS

| | | | | |
|---|---|---|---|---|
| 10,616,294 | B2* | 4/2020 | Shribman | H04L 67/02 |
| 2011/0087960 | A1* | 4/2011 | Tabone | H04L 67/1097 |
| | | | | 715/256 |
| 2011/0268425 | A1* | 11/2011 | Glen | H04N 19/44 |
| | | | | 348/553 |
| 2012/0163770 | A1* | 6/2012 | Kaiser | H04N 21/4532 |
| | | | | 386/E9.011 |
| 2016/0267529 | A1* | 9/2016 | Jakobsson | G06Q 30/0277 |
| 2018/0348967 | A1* | 12/2018 | Kondrk | G06Q 30/0641 |
| 2019/0373043 | A1* | 12/2019 | Jaiswal | H04L 67/53 |
| 2021/0093967 | A1* | 4/2021 | Hooks | A63F 13/213 |
| 2023/0092328 | A1* | 3/2023 | Ayouba | G06F 16/9577 |
| | | | | 715/234 |

FOREIGN PATENT DOCUMENTS

EP              1239669 A2 *    9/2002    ....... G06F 17/30905

* cited by examiner

*Primary Examiner* — Meng Vang (57) ABSTRACT

A computing device includes a processor to monitor usage of resources within the computing device. Responsive to the usage of resources being above a threshold, a determination is made that displayed content of a web page from an application includes video or animation content. A determination that the video or animation content is included as part of a background of the displayed content is based on a comparison of sizes between a display screen displaying the content of the web page and the video or animation content. Responsive to the determination that the background includes the video or animation content, the processor no longer plays the video or animation content to reduce resource usage by the application to display the web page.

17 Claims, 10 Drawing Sheets

RESOURCE MONITORING FOR WEB APPLICATIONS WITH VIDEO AND ANIMATION CONTENT

RELATED APPLICATIONS

This application is a continuation of PCT application serial no. PCT/CN2021/129693 filed Nov. 10, 2021, which is hereby incorporated herein in its entirety by reference.

TECHNICAL FIELD

The present disclosure relates to computing systems, and more particularly, to a computing device that monitors resource usage by a web application.

BACKGROUND

In a typical work day, users are able to access an ever-increasing amount of information through their computing devices. This information is readily accessible from a wide range of workspace resources, one category of which is applications. These applications include web applications, which may also be referred to as web apps.

In general, a web application is a software program that uses a web browser to perform a particular function. A web application runs over a network connection without being installed on the computing device accessing the web application.

Web applications include online forms, shopping carts, word processors, spreadsheets, video and photo editing, file conversion, file scanning, and email programs such as Gmail, Yahoo and AOL. Web applications provide web pages for display. Often times, a web page includes video or animation content.

SUMMARY

A computing device includes a memory, and a processor coupled to the memory. The processor is configured to monitor usage of resources within the computing device. Responsive to the usage of resources being above a threshold, a determination is made that displayed content of a web page from an application includes video or animation content. A determination that the video or animation content is included as part of a background of the displayed content is based on a comparison of sizes between a display screen displaying the content of the web page and the video or animation content. Responsive to the determination that the background includes the video or animation content, no longer play the video or animation content to reduce resource usage by the application to display the web page.

The processor may be configured to determine that the displayed content of the web page includes video based on obtaining a document object model (DOM) tree of the web page, and locating a video tag within the DOM tree, with the video tag being used to embed the video in the web page.

The processor may be configured to determine that the displayed content of the web page includes animation based on obtaining a first document object model (DOM) tree of the web page at a first point in time, obtaining a second DOM tree of the web page at a second point in time, and determining a change between the first and second DOM trees. An animation tag is located within the determined change, with the animation tag being used to embed the animation in the web page.

The computing device further includes a browser to launch the web application, and wherein the processor is configured to injected code into the browser to no longer play the video or animation content. The injected code may hide the video or animation content. Alternatively, the injected code may pause the video or animation content.

The web page may include elements to define the web page, and wherein the processor may be further configured to determine that a top cover has been placed over the video or animation content based on obtaining a document object model (DOM) tree of the web page, determining a position and size of the video or animation content, and analyzing the DOM tree for at least one element on top of the video or animation content.

The processor may be further configured to compare a size of the top cover to the size of the video or animation content, and continue to no longer play the video or animation content responsive to the size of the top cover exceeding a threshold percentage size of the video or animation content.

The processor may be further configured to examine source code of the web page to determine the size of the display screen and the size of the video or animation content.

The processor may be configured to monitor resource usage of the memory and the processor.

The processor may be further configured to provide a remote computing session to be accessed by a client device, with the client device comprising the display screen displaying the content of the web page. The processor may be configured to monitor resource usage of network traffic exchanged between the computing device and the client device.

The processor may be configured to periodically monitor usage of the resources by the web application.

Another aspect is directed to a method that includes monitoring usage of resources within a computing device. Responsive to the usage of resources being above a threshold, a determination is made that displayed content of a web page from an application includes video or animation content. Determining that the video or animation content is included as part of a background of the displayed content is based on a comparison of sizes between a display screen displaying the content of the web page and the video or animation content. Responsive to the determination that the background includes the video or animation content, no longer play the video or animation content to reduce resource usage by the application to display the web page.

Yet another aspect is directed to a non-transitory computer readable medium for a computing device as defined above.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Figure 1:
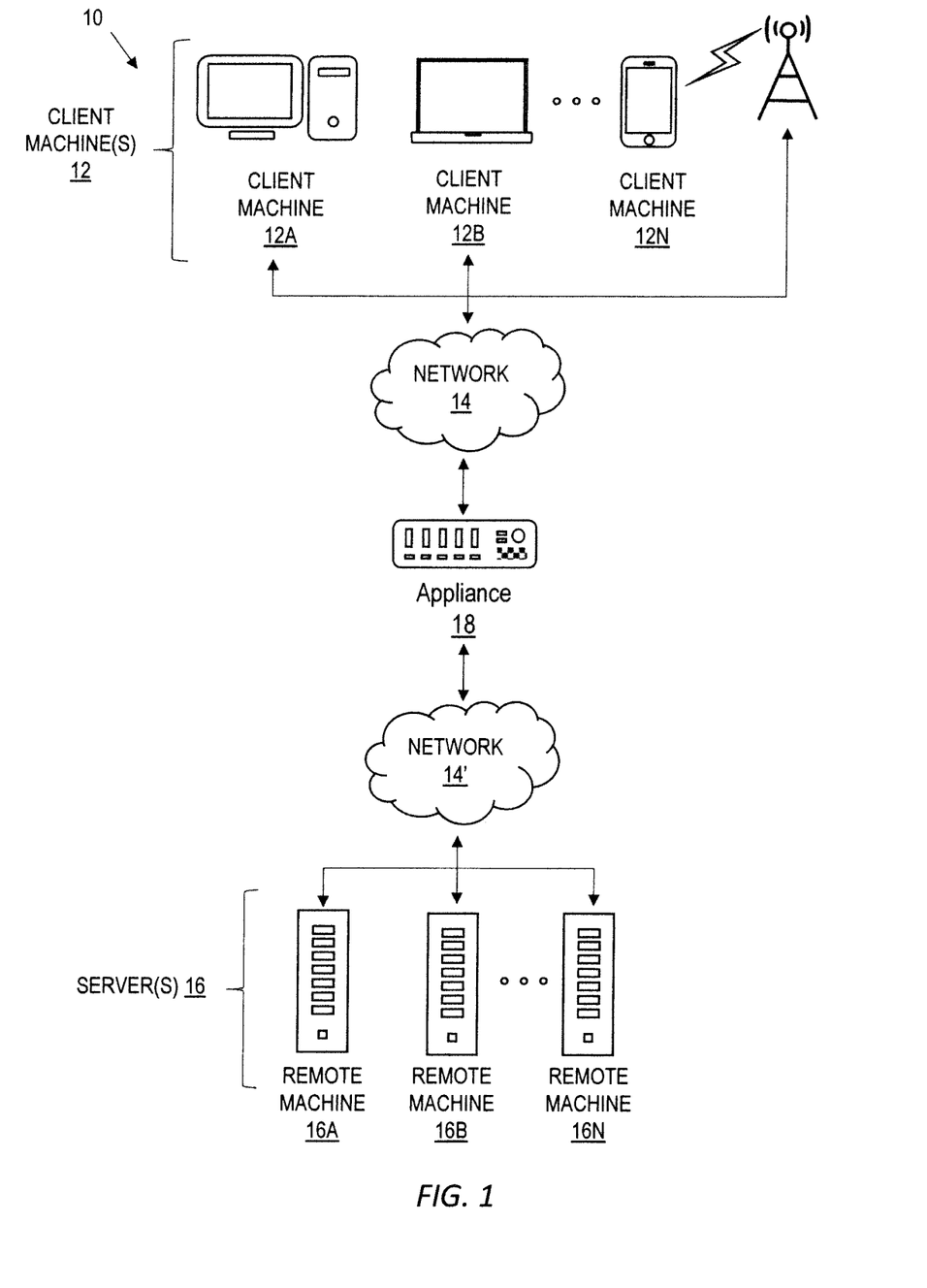
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 18 may operate as an application delivery controller (ADC) to provide clients with access to business applications and other data deployed in a data center, the cloud, or delivered as Software as a Service (Saas) across a range of client devices, and/or provide other functionality such as load balancing, etc. In some embodiments, multiple appliances 18 may be used, and the appliance (s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VOIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
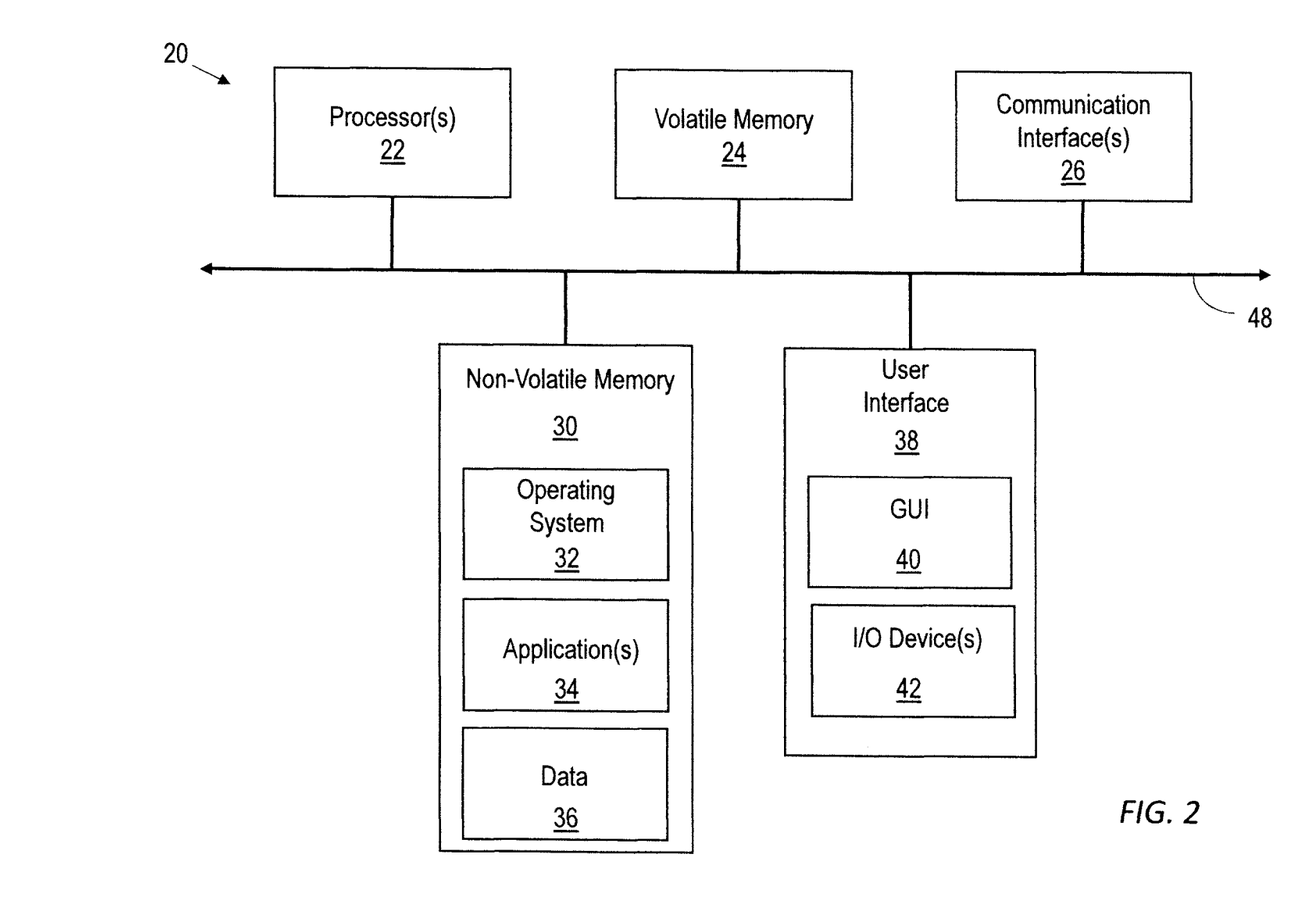
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor (s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device (s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor (s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Florida ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (Saas) and Desktop as a Service (DaaS) sessions, for example.

Figure 3:
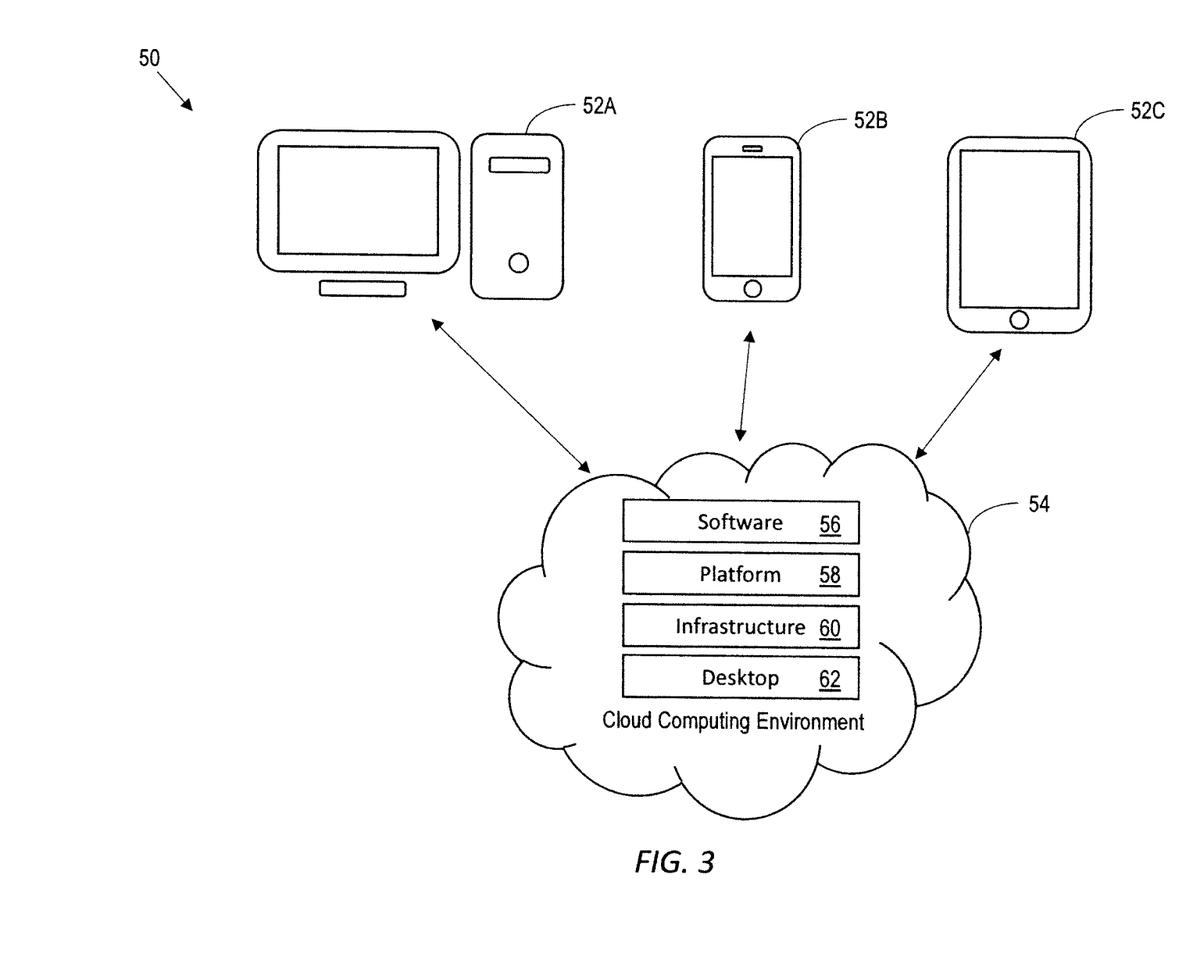
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (Saas) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

Paas providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft ONEDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Washington (herein "Azure"), or AMAZON WEB SERVICES provided by Amazon.com, Inc., of Seattle, Washington (herein "AWS"), for example. In the case of Citrix Cloud, Citrix Workspace app may be used as a single-entry point for bringing apps, files and desktops together (whether on-premises or in the cloud) to deliver a unified experience.

Figure 4:
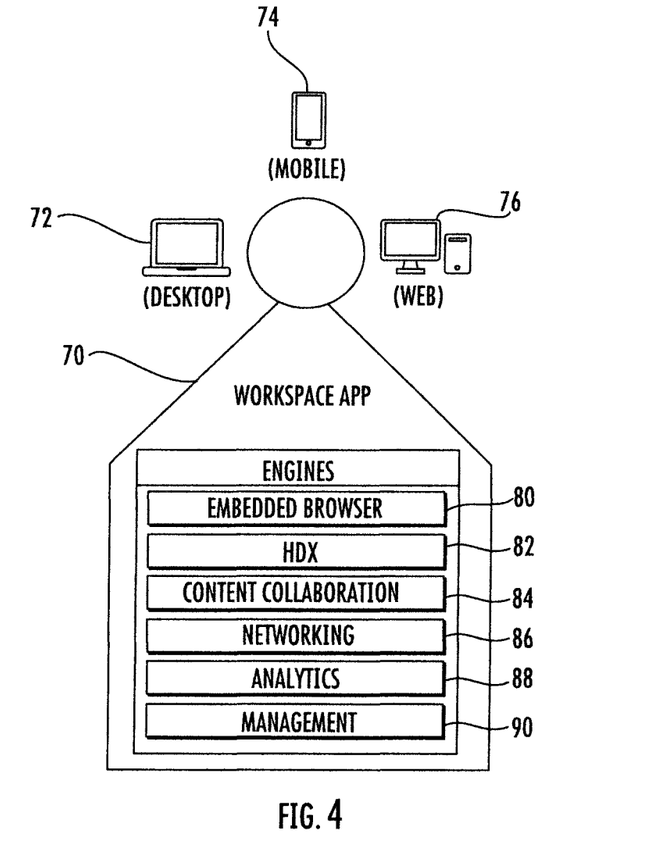
FIG. 4 is a schematic block diagram of desktop, mobile and web based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints. As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific u-VPN connection. A u-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
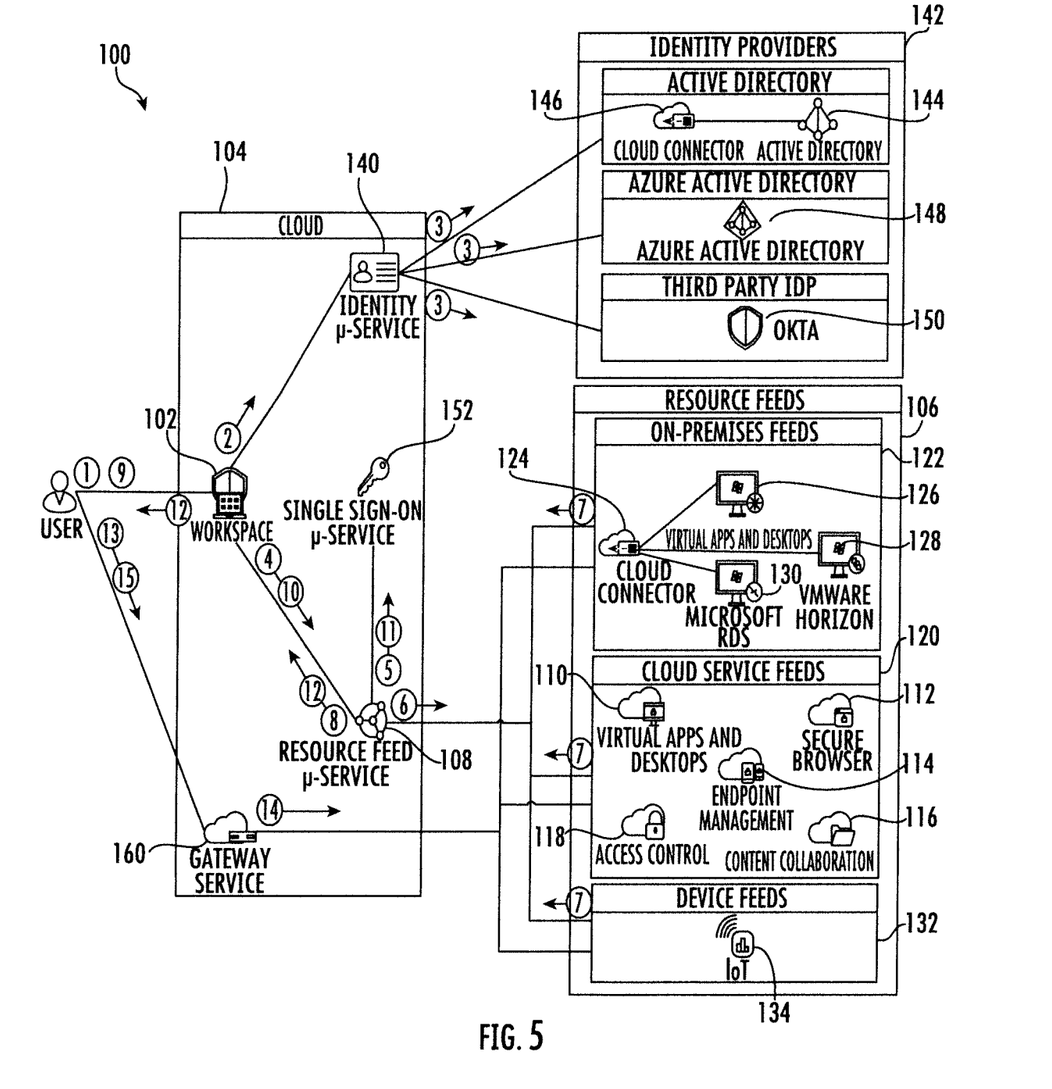
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Citrix Cloud 104. The workspace experience service 102 then pulls in all the different resource feeds via a resource feed micro-service 108. That is, all the different resources from other services running in the Citrix Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IOT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Citrix Cloud 104, and presenting their identity (event 1). The identity includes a user name and password, for example.

The workspace experience service 102 forwards the user's identity to an identity micro-service 140 within the Citrix Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Citrix Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

Figure 6:
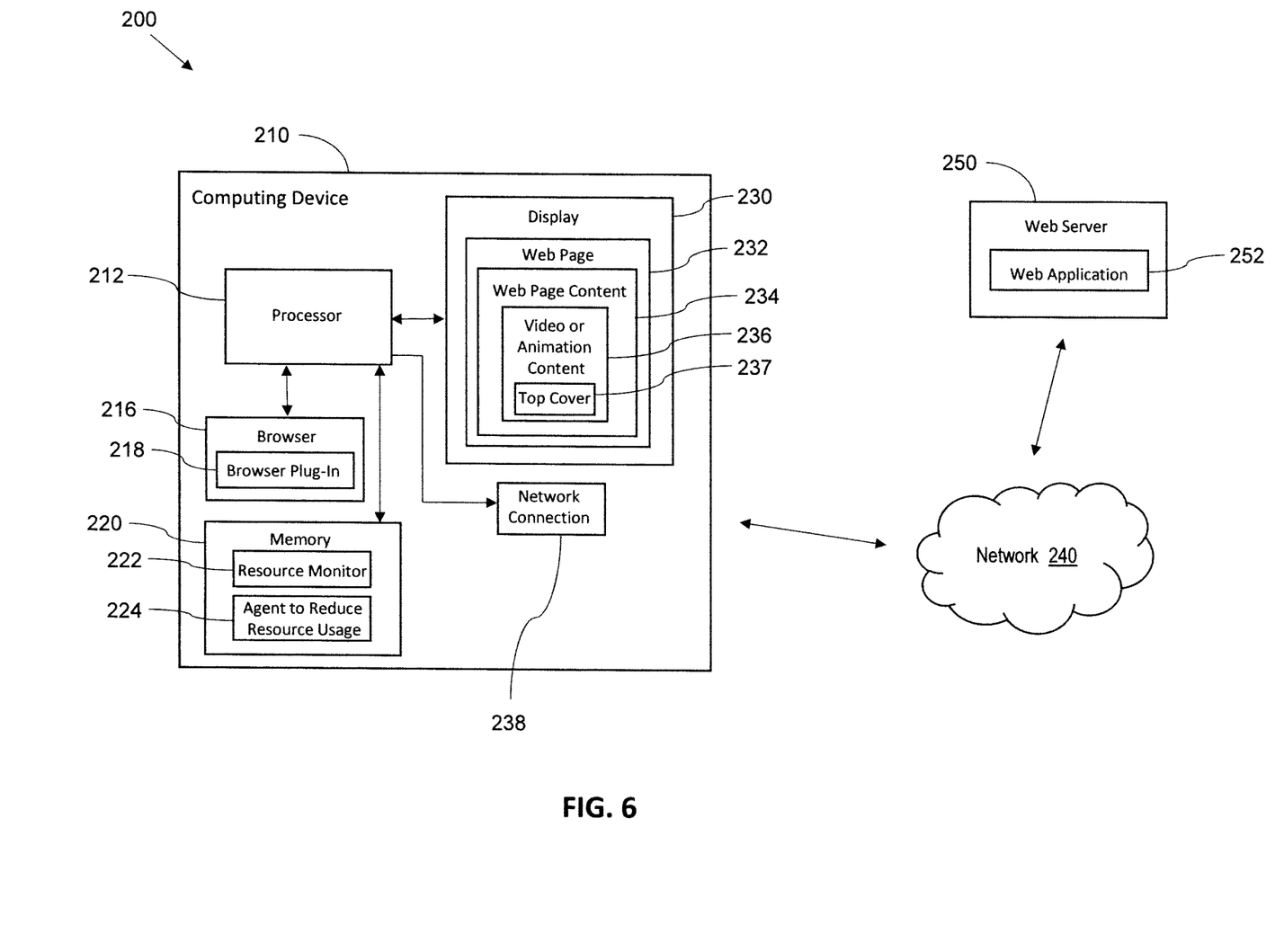
FIG. 6 is a schematic block diagram of a computing device configured to reduce resource usage for a web application with video or animation content, in which various aspects of the disclosure may be implemented.

Referring now to FIG. 6, a computing system 200 includes a computing device 210 configured to reduce usage of resources by a web application 252 will be discussed. Often times the content 234 of a web page 232 includes video or animation content 236 that is not meaningful to the user. In this case the video or animation content 236 may also be referred as unnecessary movement within the web page 232.

The video or animation content 236 is considered to be not meaningful if the user does not need the video or animation content 236 to understand the displayed content 234 of the web page 232. Even though the video or animation content 236 is part of a background of the displayed content 234, resources within the computing device 210 are being consumed. Excess usage of resources within the computing device 210 by the web application 252 may cause a noticeable decrease in performance of the computing device 210. Consequently, user experience may be negatively impacted.

As will be explained in greater detail below, the processor 212 is configured to monitor usage of resources within the computing device 210, which may be impacted by the web application 252 displaying the content 234 of the web page 232. Responsive to the usage of resources being above a threshold, the processor 212 determines if the displayed content 234 includes video or animation content 236 that is part of the background of the displayed content 234.

The determination that the video or animation content 236 is included as part of the background of the displayed content 234 is based on a comparison of a size of a display screen 230 displaying the content 234 of the web page 232 and a size of the video or animation content 236. Responsive to the determination that the background includes the video or animation content 236, the processor 212 no longer plays the video or animation content to reduce resource usage by the web application 252 to display the web page 232.

For instance, if the size of the video or animation content 236 is small compared to the size of the displayed content 234, then the video or animation content 236 is considered to be running in the background of the displayed content 234. This corresponds to the video or animation content 236 not being meaningful. Conversely, if the size of the video or animation content 236 is large compared to the size of the displayed content 234, then the video or animation content 236 is considered to be running in the foreground of the displayed content 234. This corresponds to the video or animation content 236 being meaningful.

Web applications 252 are usually coded in browser-supported language such as JavaScript and HTML as these languages rely on the browser 218 to render the program executable. Some web applications 252 may be dynamic, requiring server-side processing. Other web applications 252 may be completely static with no processing required at the web server 250.

Web applications 252 require the web server 250 to manage requests from the computing device 210, an application server associated with the web server 250 to perform the tasks requested. Sometimes a database associated with the web server 250 is required to store information generated via the web application 252.

Developers code web applications in two types of languages. A web application 252 generally uses a combination of server-side script and client-side script to function. The server-side script deals with storing and retrieving the information and requires languages like Python or Java. Developers program server-side to create scripts the web application 252 will use. The client-side script requires languages like JavaScript, Cascading Style Sheets (CSS) and HTML5. These languages rely on the browser 216 to execute the program. They are browser-supported languages. The client-side script deals with the presentation of the information to the user.

Figure 7:
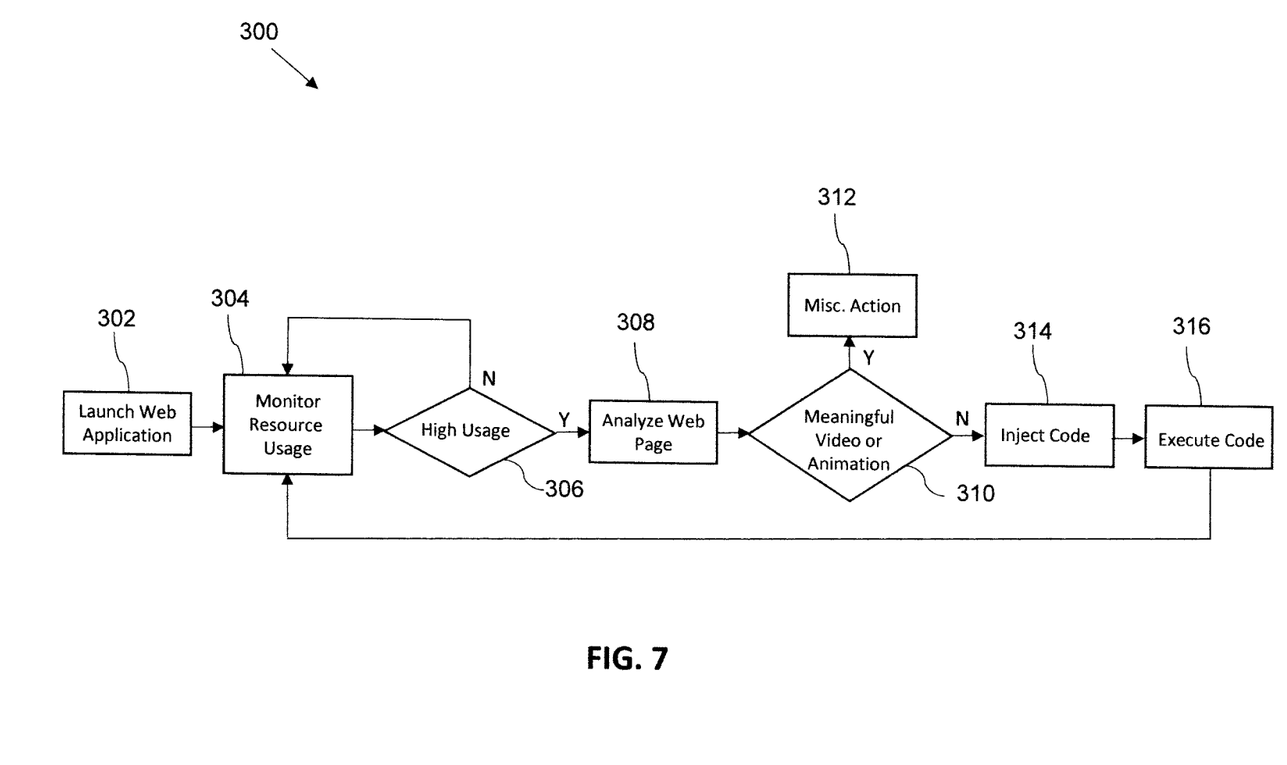
FIG. 7 is a flow diagram for reducing resource usage by the web application within the computing device illustrated in FIG. 6.

Referring now to FIG. 7, a flow diagram 300 for reducing resource usage within the client device 210 by the web application 252 will be discussed, along with the actions to be taken if the video or animation content 236 included therein is not meaningful. The browser 216 in the computing device 210 connects to the web server 250 over the network 240 to launch the web application 252 in Block 302. This results in a web page 232 from the web application 252 being displayed to the user on the display 230.

The processor 212 utilizes a resource monitor 222 to monitor resource usage of the computing device 210 in Block 304. The resource monitor 222 is utility software designed to analyze the use of hardware in the computing device 210. The hardware being monitored includes the processor 212, the memory 220 and the network connection 238.

The processor 212 further utilizes an agent 224 to periodically call the resource monitor 222 to query the resource usage within the computing device. The agent 224 is a computer program that analyzes the queried resource usage to determine if the resource usage exceeds one or more thresholds.

Block 306 determines if the resource usage is high. In response to the agent 224 determining that the computing device 210 is not in a high usage mode, then the process loops back to Block 304 to continue monitoring resource usage by the computing device 210.

If usage of the processor 212 exceeds a percentage threshold of usage, then the computing device 210 is in a high usage mode. A processor usage percentage threshold may be 80%, for example. Similarly, if usage of the memory 220 exceeds a memory usage percentage threshold, then the computing device 210 is in a high usage mode. The memory usage percentage threshold may be 1 GB, for example. If usage of the network connection 238 exceeds a network usage percentage threshold, then the computing device 210 is in a high usage mode. The network usage percentage threshold may be network traffic that exceeds 300 KB per second, for example. These percentage usage threshold values are for illustration purposes and or not to be limiting as other values be readily be used.

In response to the computing device 210 being in a high resource usage mode, the web page 232 is analyzed in Block 308. There are several steps being performed in Block 308, which will now be discussed in reference to the flow chart 350 illustrated in FIG. 8.

Figure 8:
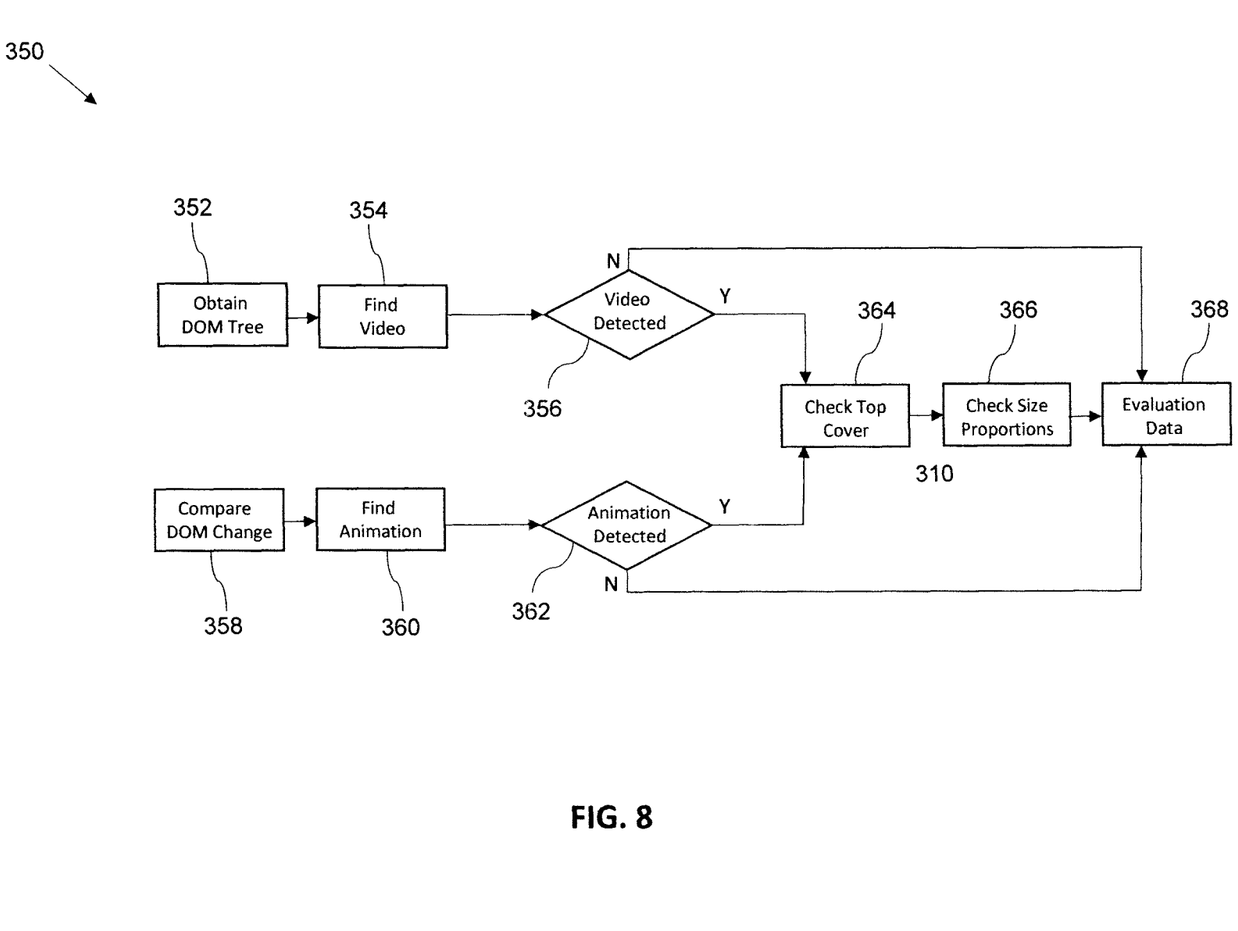
FIG. 8 is a flow diagram for analyzing a displayed web page to be used in the flow diagram illustrated in FIG. 7.

As illustrated in FIG. 8, the web page 232 is analyzed separately for video content and animation content. For the video content, the processor 212 obtains the document object model (DOM) of the web page 232 in Block 352. The DOM is a cross-platform and language-independent interface that treats an XML or HTML document as a tree structure wherein each node is an object representing a part of the document. The DOM represents the displayed web page 232 as a logical tree. Each branch of the tree ends in a node, and each node contains objects. DOM methods allow programmatic access to the tree, which allows changes to be made in the display of the web page 232.

The DOM tree is queried in Block 354 for video tags. A video tag is represented as <video> tag within the DOM tree. If a video tag is located, this indicates that the web page 232 includes video. A video tag is used to embed video content in the web page 232, such as a movie clip or other video streams. The <video> tag contains one or more <source> tags with different video sources. A determination is made in Block 356 if the web page 232 includes video content based on the presence of a video tag.

For the animation content, the processor 212 obtains another DOM tree of the web page 232 in Block 358, and compares the DOM trees for changes. The difference in time between the DOM trees may be several seconds or more, for example. Since an animation lets an element within the web page 232 gradually change from one style to another, the comparison of the DOM trees is used to find the animation content in Block 360.

A scalable vector graphics (SVG) tag within the DOM trees indicates that the web page 232 includes animation. An <svg> tag is used as a container for SVG graphics. SVG graphics is a language for two-dimensional graphics based on XML with support for animation and interactivity. The <svg> tag comes in pairs. The animation content is written between the opening (<svg>) and the closing (</svg>) tags. A determination is made in Block 362 if the web page 232 includes animation content based on the presence of <svg> tags.

If the web page 232 includes video content, then the process continues to Block 364. Similarly, if the web page 232 includes animation content, then the process also continues to Block 364. Block 364 determines if the video or animation content 236 includes a top cover 237. A top cover may also be referred to as an overlay, and is part of the web page 232. A top cover 237 includes one or more elements overlaying the video or animation content 236.

In XML and HTML, an element may contain a data item or a chunk of text or an image. A typical element includes an opening tag with some attributes, enclosed text content, and a closing tag. The top cover 237 is determined by getting the position and size of the video or animation content 236, and then using the DOM tree to determine if one or more elements are on top of the video or animation content 236.

In Block 366 various size proportions of the web page 232 are determined. The size of the display screen 230, and the size of the video or animation content 236 are determined. If the video or animation content 236 includes a top cover 237, then the size of the top cover 237 is also determined.

Generally, when the web page 236 is loaded, its source file will not change except for any animation elements. Source files are the files used to create the design of the web page 236. Source files contain the data that is being extracted from the source system before it is being transformed to the common data format (CDF).

The common data format is software that provides an interface for the storage and manipulation of multi-dimensional data sets. Source files typically contain the data in its raw form. The data can be divided into any number and types of files, representing the way the data is stored in the source system. After the source file is available, the various sizes are determined using the DOM tree.

The information or data needed to determine if the video or animation content 236 is meaningful are provided to Block 368 for evaluation. This information includes the size of the display 230, the size of the video or animation content 236, and the size of the top cover 237 if there is one. If the web page 236 did not include any video or animation content 236 based on decision Blocks 356 and 362, then this information is provided to Block 368 as well.

Referring now back to the flow chart 300 illustrated in FIG. 7, a determination is made in Block 310 on if the video or animation content 236 is meaningful based on the evaluation data received from Block 368. As an example, the size of the display screen 230 is 1024 by 768 pixels which equals 786, 432 pixels, and the size of the video or animation content 236 is 800 by 600 pixels which equals 480,000 pixels. The size of the top cover 237 is 50 by 5 pixels which equals 250 pixels.

As noted above, the determination that the video or animation content 236 is included as part of the background of the displayed content 234 is based on a comparison of the size of the display screen 230 displaying the content 234 of the web size of the video or animation content 236 is divided by the size of the display screen 230.

In the above example sizes, this comes out to 61%. The video or animation content 236 covers 61% of the display screen 230. This value is compared to a threshold value, such as 50%. Since 61%>50%, the video or animation content 236 is considered to be running in the foreground of the displayed content 234. This corresponds to the video or animation content 236 being meaningful.

In response to resource usage being high within the computing device 210 but with the video or animation content 236 being meaningful, the video or animation content 236 continues to play. Also, miscellaneous action may be taken. For example, the video or animation content 236 may be recorded by the computing device 210 since it is meaningful. Another miscellaneous action is for the processor 212 to send a notification to the backend when the computing device 210 operates within an enterprise.

If the size proportions was less than 50%, then the video or animation content 236 is considered to be running in the background of the displayed content 234. This corresponds to the video or animation content 236 not being meaningful.

Also, if there is a top cover 237, then the size of the top cover 237 is divided by the size of the video or animation content 236. In the above example sizes, this comes out to 0.05%. This value is compared to a threshold value, such as 20%. Since 0.05%<20%, the video or animation content 236 is considered to be meaningful.

If the video or animation content 236 is determined to not be meaningful based on the size of the video or animation content 236 with respect to the size of the display 230, and the size of the top cover 237 with respect to the size of the video or animation content 236, then the video or animation content 236 no longer plays. This is based on code being injected by the agent 224 into the browser 216 in Block 314.

The browser 216 may be an unmanaged browser or a managed browser. An unmanaged browser requires a browser plug-n 218 to inject the code, whereas a managed browser does not require a browser one. Example unmanaged browsers include Chrome developed by Google, Firefox developed by Mozilla, and Edge developed by Microsoft. The source code for an unmanaged browser is a closed source software framework and cannot be modified.

A browser plug-in 218 is not needed for a managed browser since the source code of the browser can be modified. An example managed browser is Chromium. The Chromium browser is embedded within another application, such as the workspace app 70 as discussed above. The Chromium embedded browser enables developers to add web browsing functionality to their application, as well as the ability to use HTML, CSS, and JavaScript to create the application's user interface. In this case, the source code for the managed browser is modified to inject the code to stop playing the video or animation content 236.

The code being injected into the browser 216 may be included within a JavaScript (JS) library. JavaScript is a text-based programming language used both on the client-side and server-side that allows web pages to be interactive. Where HTML and CSS are languages that give structure and style to web pages, JavaScript gives web pages interactive elements that engage a user.

A JS library is an encapsulated specific collection of code that is provided to developers for different browsers. There may be different scripts to control different browsers, so the collection of scripts is referred to as a library. The library can be included in the web page 236 by including the library in the html code.

The injected code is executed in Block 316 to no longer play the video or animation content 236 by modifying the video or animation tags. The video or animation tags within the DOM tree may be modified to stop or hide the video or animation content 236.

When the video or animation content 236 is stopped (e.g. paused), the video or animation content 236 is still displayed but as a static image. To stop the video or animation content 236, stop( ) is injected into the browser 216. When the video or animation content 236 is hidden, the video or animation content 236 is no longer displayed on display 230. To hide the video or animation content 236, hide( ) is injected into the browser 216.

After the injected code has been executed, then the process loops back to monitoring resources in Block 304.

Figure 9:
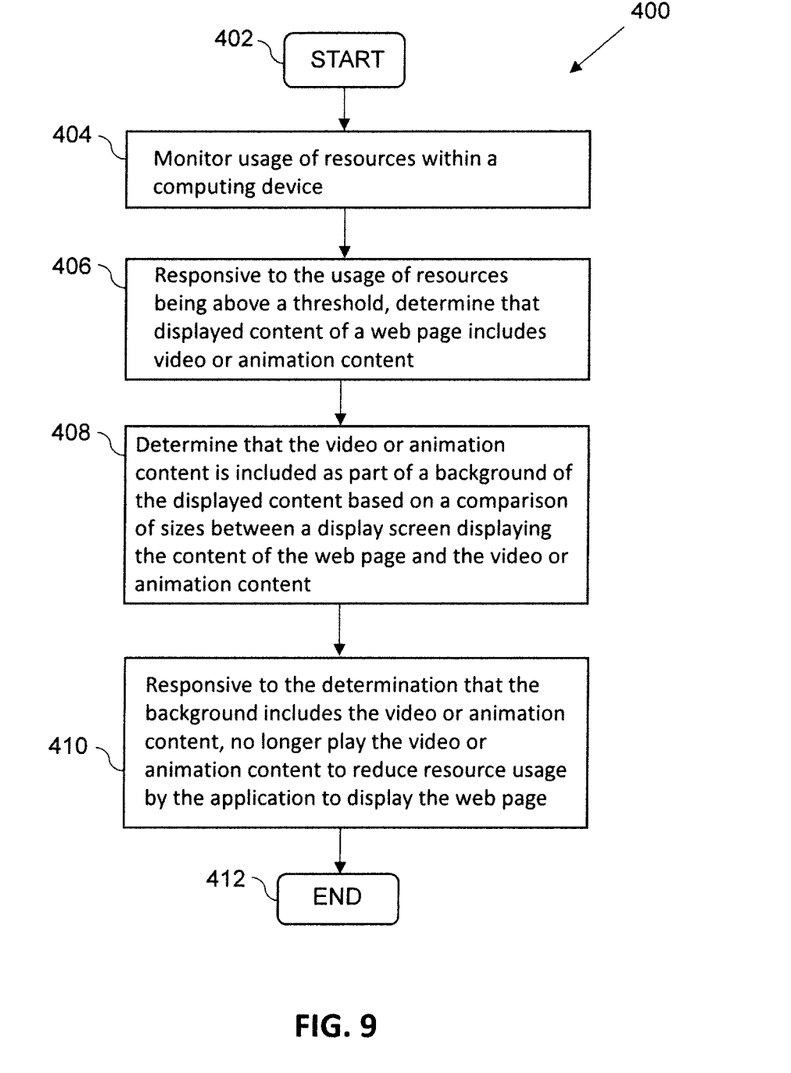
FIG. 9 is a flow diagram for operating the computing device illustrated in FIG. 6.

Referring now to FIG. 9, a flow diagram 400 for operating the computing device 210 will be discussed. From the start (Block 402), usage of resources within the computing device 210 are monitored in Block 404. Responsive to the usage of resources being above a threshold, a determination is made in Block 406 on if the displayed content 234 includes video or animation content 236. A determination is made in Block 408 on if the video or animation content 236 is included as part of a background of the displayed content 234 based on a comparison of sizes between a display screen displaying the content 234 of the web page 232 and the video or animation content 236. Responsive to the determination that the background includes the video or animation content 236, the video or animation content 236 is no longer played in Block 410 to reduce resource usage by the application 252 to display the web page 232. The method ends at Block 412.

Figure 10:
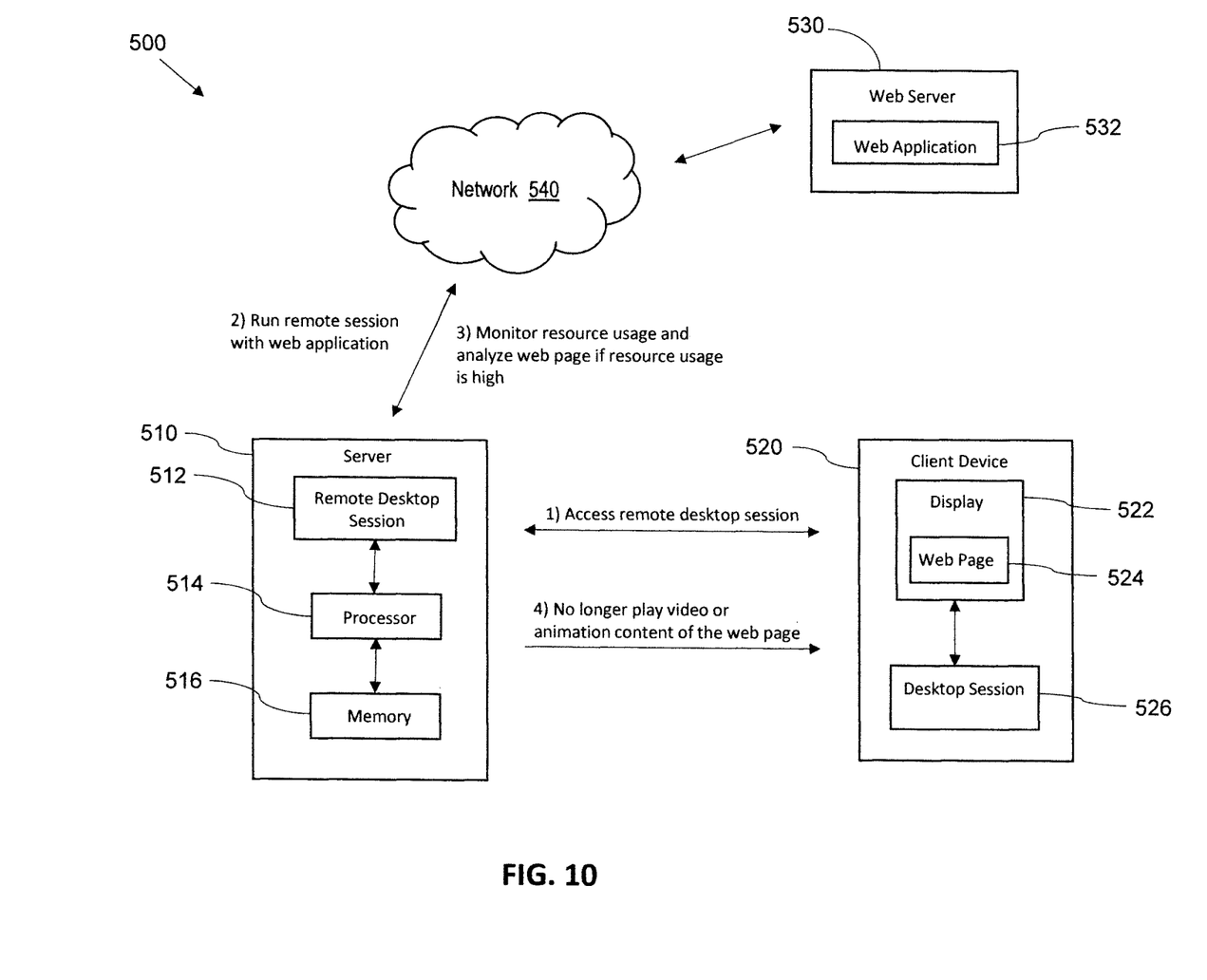
FIG. 10 is a schematic block diagram of a computing system with a server configured to reduce resource usage for a web application running in a remote desktop session being accessed by a client device, in which various aspects of the disclosure may be implemented.

Referring now to FIG. 10, a high level computing system 500 with a server 510 configured to reduce resource usage for a web application 532 running in a remote desktop session 512 being accessed by a client device 520 will be discussed. The server 510 includes a processor 514 and a memory 516 configured to provide the remote desktop session for the client device 520. The client device 520 accesses the remote desktop session 512 in step 1) to operate a remote browser in the server 510 to launch the web application 532 at a web server 530 over a network 540.

In step 2), the remote desktop session 512 is running with the web application 532 providing a web page 524 for display on display 522 in the client device 520. In step 3) the server 510 monitors resource usage within the server 510. If the resource usage is high, then the server 510 analyzes the web page 524 for video or animation content, as discussed above.

In step 4, responsive to the video or animation content not being meaningful, then the video or animation content is no longer played for the client device 520. As discussed above, code is injected into the remote browser by the server 510 to hide or pause the video or animation content. This advantageously reduces resource usage in the server 510 by the web application 532 to display the web page 524. User experience with the remote desktop session 512 is improved.

As will be appreciated by one of skill in the art upon reading the above disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. A computing device comprising:
a memory; and
a processor coupled to said memory and configured to perform the following:
monitor usage of resources within the computing device,
responsive to the usage of resources being above a threshold, determine that displayed content of a web page from an application includes video or animation content,
determine that the video or animation content is included as part of a background of the displayed content based on a comparison of sizes between a display screen displaying the content of the web page and the video or animation content, and
responsive to the determination that the background includes the video or animation content, no longer play the video or animation content to reduce resource usage by the application to display the web page;
wherein said processor is configured to determine that the displayed content of the web page includes animation based on the following;
obtain a first document object model (DOM) tree of the web page at a first point in time;
obtain a second DOM tree of the web page at a second point in time;
determine a change between the first and second DOM trees; and
locate an animation tag within the determined change, with the animation tao being used to embed the animation in the web page.

2. The computing device according to claim 1 wherein said processor is configured to determine that the displayed content of the web page includes video based on the following:
obtain a document object model (DOM) tree of the web page; and
locate a video tag within the DOM tree, with the video tag being used to embed the video in the web page.

3. The computing device according to claim 1 further comprising a browser to launch the web application, and wherein said processor is configured to injected code into the browser to no longer play the video or animation content.

4. The computing device according to claim 3 wherein the injected code hides the video or animation content.

5. The computing device according to claim 3 wherein the injected code pauses the video or animation content.

6. The computing device according to claim 1 wherein said processor is further configured to examine source code of the web page to determine the size of the display screen and the size of the video or animation content.

7. The computing device according to claim 1 wherein said processor is configured to monitor resource usage of said memory and said processor.

8. The computing device according to claim 1 wherein said processor is further configured to provide a remote computing session to be accessed by a client device, with the client device comprising the display screen displaying the content of the web page.

9. The computing device according to claim 8 wherein said processor is configured to monitor resource usage of network traffic exchanged between the computing device and the client device.

10. The computing device according to claim 8 wherein said processor is configured to periodically monitor usage of the resources by the web application.

11. A method comprising:
monitoring usage of resources within a computing device;
responsive to the usage of resources being above a threshold, determining that displayed content of a web page from an application includes video or animation content;

determining that the video or animation content is included as part of a background of the displayed content based on a comparison of sizes between a display screen displaying the content of the web page and the video or animation content; and responsive to the determination that the background includes the video or animation content, no longer play the video or animation content to reduce resource usage by the application to display the web page;

wherein determining that the displayed content of the web page includes animation is based on the following:
  obtaining a first document object model (DOM) tree of the web page at a first point in time;
  obtaining a second DOM tree of the web page at a second point in time;
  determining a change between the first and second DOM trees; and
  locating an animation tag within the determined change, with the animation tag being used to embed the animation in the web page.

12. The method according to claim 11 wherein determining that the displayed content of the web page includes video is based on the following:
  obtaining a document object model (DOM) tree of the web page; and
  locating a video tag within the DOM tree, with the video tag being used to embed the video in the web page.

13. The method according to claim 11 further comprising the following:
  using a browser to launch the web application; and
  injecting code into the browser to no longer play the video or animation content.

14. The method according to claim 13 wherein the injected code hides the video or animation content.

15. The method according to claim 13 wherein the injected code pauses the video or animation content.

16. A computing device comprising:
a memory; and
a processor coupled to said memory and configured to perform the following:
monitor usage of resources within the computing device,
responsive to the usage of resources being above a threshold, determine that displayed content of a web page from an application includes video or animation content,
determine that the video or animation content is included as part of a background of the displayed content based on a comparison of sizes between a display screen displaying the content of the web page and the video or animation content, and
responsive to the determination that the background includes the video or animation content, no longer play the video or animation content to reduce resource usage by the application to display the web page;
wherein the web page comprises elements to define the web page, and wherein said processor is further configured to determine that a top cover has been placed over the video or animation content based on the following:
obtain a document object model (DOM) tree of the web page;
determine a position and size of the video or animation content; and
analyze the DOM tree for at least one element on top of the video or animation content.

17. The computing device of claim 16, wherein the processor is further configured to:
  compare a size of the top cover to the size of the video or animation content; and
  continue to no longer play the video or animation content responsive to the size of the top cover exceeding a threshold percentage size of the video or animation content.

* * * * *